United States Patent Office.

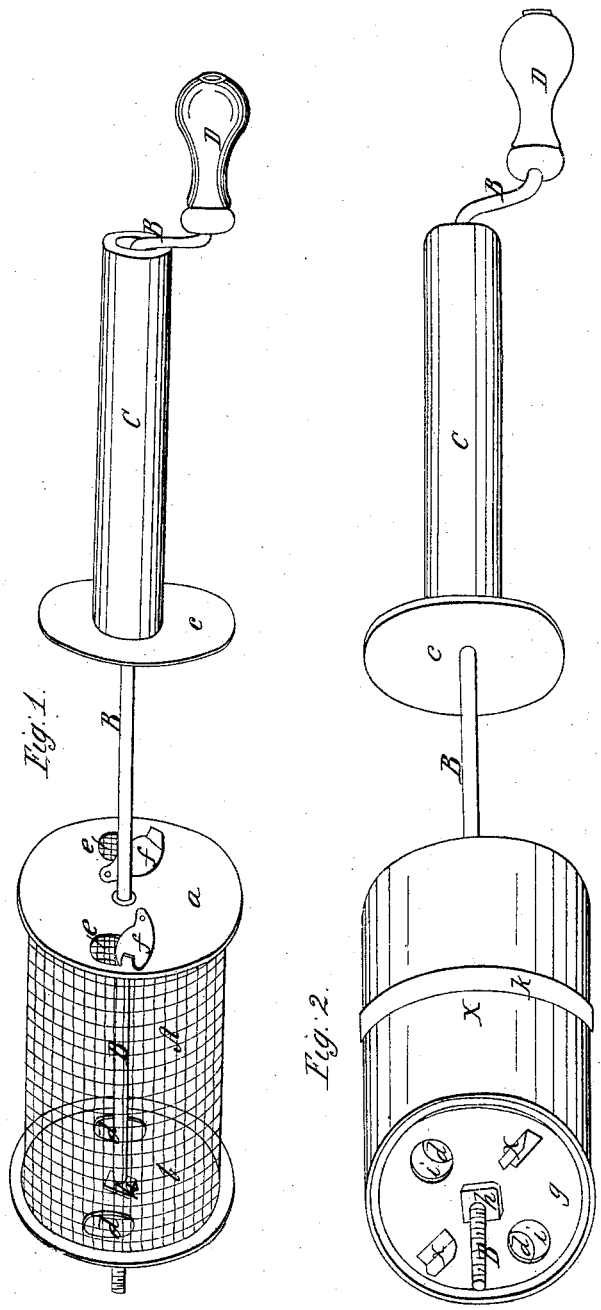

L. A. WARNER, OF FREEPORT, ILLINOIS.

*Letters Patent No. 76,362, dated April 7, 1868.*

---

IMPROVEMENT IN CORN-POPPERS AND COFFEE-ROASTERS.

---

The Schedule referred to in these Letters Patent and making part of the same.

---

Know all men that I, L. A. WARNER, of Freeport, in the county of Stephenson, and State of Illinois, have invented certain new and useful Improvements in Corn-Poppers and Coffee-Roasters; and I hereby declare that the following is a clear and exact description of the same, reference being had to the accompanying drawings, in which—

Figure I is a perspective from the right hand; and

Figure II is a perspective view from the left hand.

The letters in each figure representing the same points.

Fig. I represents the cylinder as a corn-popper, Fig. II shows the added cylinder as a tight coffee-roaster, as hereinafter described. A, Fig. I, shows the wire-cloth cylinder, B the shaft or axle, one end of which is put through the cylinder A, and made fast to the head, $b$, by means of screw-nuts $h$, while the other end extends to such length as is desirable for the purposes hereinafter described, and terminates in a crank, D. C is a loose sleeve-handle, which serves as a box or bearing for the shaft B to revolve in as a journal, designed to be held fast in one hand, while the crank is turned with the other. $c$ is a metallic circular plate, guard, or reflector, made of bright metal, to shield the hand from the heat. $a$ and $b$ represent the metallic heads of cylinder; $e$ shows holes through the metal head, $a$, and through them is seen the wire-cloth lining. These holes are closed by the covers or caps $f$ being turned over them. Holes, $d$, are made through the head $b$ for admitting and discharging the contents of cylinder A. On the outside of the head $b$ is placed a plate or cap, somewhat smaller than the head $b$, marked $g$, Fig. II, in which are made holes $i$, corresponding with $d$ in the head $b$. The plate $g$ is made to turn on shaft B, a hole being made in the centre of the plate, large enough to put in a washer a little thicker than the plate, against which the screw-nut is turned tight, holding the plate to its place, and allowing it to turn round, by means of projections, $x$, thus opening and closing the holes at pleasure. X, Fig. II, is a metallic cylinder, made to surround the cylinder A, fitting close to the projecting edges of the heads $a$ and $b$, as seen in Fig. I, leaving a space between it and the wire-cloth cylinder A, made a little tapering, so as to be fastened by sliding on a hook, $k$, or fastened by other means, so as to be removable at pleasure.

The method of using the machine for popping corn is, to remove the cylinder X, open the holes $e$, put in the corn through the openings $d$, turn the plate $g$ to close the openings, then take the machine by the holder C with one hand, and reach or extend the cylinder through the door into the stove or furnace, the shaft B being of sufficient length, say two and a half to three and a half feet, for that purpose, over hot coals, or place or hold it over an open fire. Then turn by the crank D, observing the progress through the holes $e$, till the popping is complete.

For roasting coffee, the holes $e$ are closed, the outer cylinder X is put on, and the machine is then operated the same as for popping corn, the progress of roasting being tested from time to time, by opening one of the holes $e$ or $d$, at pleasure.

What I claim as my invention, and desire to secure by Letters Patent, is—

1. The outer movable cylinder or jacket, (constructed so as to be removed at pleasure,) when used to enclose a wire-cloth cylinder, with a space between, in the manner substantially as described, and for the purposes set forth.

2. The cylinders A and X, combined so as to be convertible into an open popper or a tight roaster, in the manner described, and combined with the holes $d$ and $i$ and plate $g$, the holes $e$, caps $f$, axle B, and handle C, in the manner substantially as described, and for the purposes set forth.

L. A. WARNER.

Witnesses:
J. A. CRAIN,
T. D. WILCOXON.